US009194449B2

(12) United States Patent
Wegel

(10) Patent No.: US 9,194,449 B2
(45) Date of Patent: Nov. 24, 2015

(54) SUSPENSION DEVICE FOR USE WITH LOW TEMPERATURE REFRIGERATOR

(75) Inventor: Donald C. Wegel, Silver Spring, MD (US)

(73) Assignee: THE UNITED STATES OF AMERICA AS REPRESENTED BY THE ADMINISTRATOR OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 697 days.

(21) Appl. No.: 13/204,767

(22) Filed: Aug. 8, 2011

(65) Prior Publication Data

US 2013/0036750 A1    Feb. 14, 2013

(51) Int. Cl.
*F25B 21/00* (2006.01)
*F16F 1/00* (2006.01)

(52) U.S. Cl.
CPC . *F16F 1/00* (2013.01); *F25B 21/00* (2013.01); *Y02B 30/66* (2013.01)

(58) Field of Classification Search
CPC ....... F25B 21/00; F25D 19/006; H01F 1/012; Y02B 30/66; Y02B 30/66; F16F 1/00
USPC .............................. 62/3.1, 51.1; 248/601, 600
See application file for complete search history.

(56) References Cited

U.S. PATENT DOCUMENTS

| | | | | |
|---|---|---|---|---|
| 4,785,636 A * | 11/1988 | Hakuraku et al. | ............... | 62/3.3 |
| 5,444,983 A * | 8/1995 | Howard | ............... | 62/3.1 |
| 5,934,077 A * | 8/1999 | Martinis | ............... | 62/3.1 |
| 6,526,759 B2 * | 3/2003 | Zimm et al. | ............... | 62/3.1 |
| 6,959,554 B1 | 11/2005 | Shirron et al. | | |
| 8,429,920 B2 * | 4/2013 | Duval | ............... | 62/3.1 |

\* cited by examiner

*Primary Examiner* — Melvin Jones
(74) *Attorney, Agent, or Firm* — Christopher O. Edward

(57) ABSTRACT

A suspension device for use with a low temperature refrigeration system, such as an adiabatic demagnetization refrigerator is provided. A support ring is provided with three spring-loaded tension assemblies equally spaced about the periphery of the support ring. The tension assemblies each have a pulley, about which is entrained a band of material. Connected to this band is a ring that laterally supports a cylindrical salt pill. Undesired variations in the amount of slack in the band as the salt pill cools are compensated for by the spring loading of the tension assemblies.

18 Claims, 4 Drawing Sheets

SUSPENSION DEVICE FOR USE WITH LOW TEMPERATURE REFRIGERATOR

ORIGIN OF THE INVENTION

The invention described herein was made by an employee of the United States Government, and may be manufactured and used by or for the Government for government purposes without the payment of any royalty thereon or therefore.

TECHNICAL FIELD

The field of the invention is a suspension device utilized in low temperature environments, and more particularly, one for use with an adiabatic demagnetization refrigerator (ADR) capable of achieving temperatures near absolute zero.

BACKGROUND OF THE INVENTION

Certain astronomical observations are most readily made with a detector array that has been cooled to within a fraction of 1 degree Kelvin. In order to provide and maintain so low a temperature, adiabatic demagnetization refrigeration systems have been developed that can provide such temperatures. They entail the use of salts having suitably large magnetic moments which are subjected to the cooling effects of the adiabatic demagnetization process employed, the details of which are not part of the subject matter of this application but which are further discussed in U.S. Pat. No. 6,959,554, the contents of which are hereby incorporated by reference. This salt is housed in a cylinder called a "salt pill," which is located in a bore contained within a magnet that is part of the ADR.

SUMMARY OF THE INVENTION

To stabilize at least one end of the salt pill against lateral loads, a suspension device is provided that connects the salt pill to the magnets or other housing elements employed in the adiabatic demagnetization refrigerator apparatus. First, the salt pill is placed within a holder. This holder is attached to an aramid rope or band, which is held in a taught configuration by a series of three spring loaded tension assemblies. The band is made of a material having a low coefficient of thermal conductivity and high strength. An aramid fiber sold under the trademark Kevlar® is suitable for this purpose. The tension assemblies are arrayed equally spaced about a ring-shaped base, and consist of a generally T-shaped tension arm spring loaded to be urged in a generally outwardly radial direction and a pulley about which the band is entrained. Should the band slacken during the cooling process, the spring force provided within the tension assemblies directs the pulley in a generally outwardly direction, thereby taking up any slack and maintaining the tension and stiffness of the system.

The device provides the end of the salt pill to which it is attached with stability against lateral loads as well as good thermal isolation of the salt pill with respect to the ADR so as to minimize parasitic heating.

The foregoing and more will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
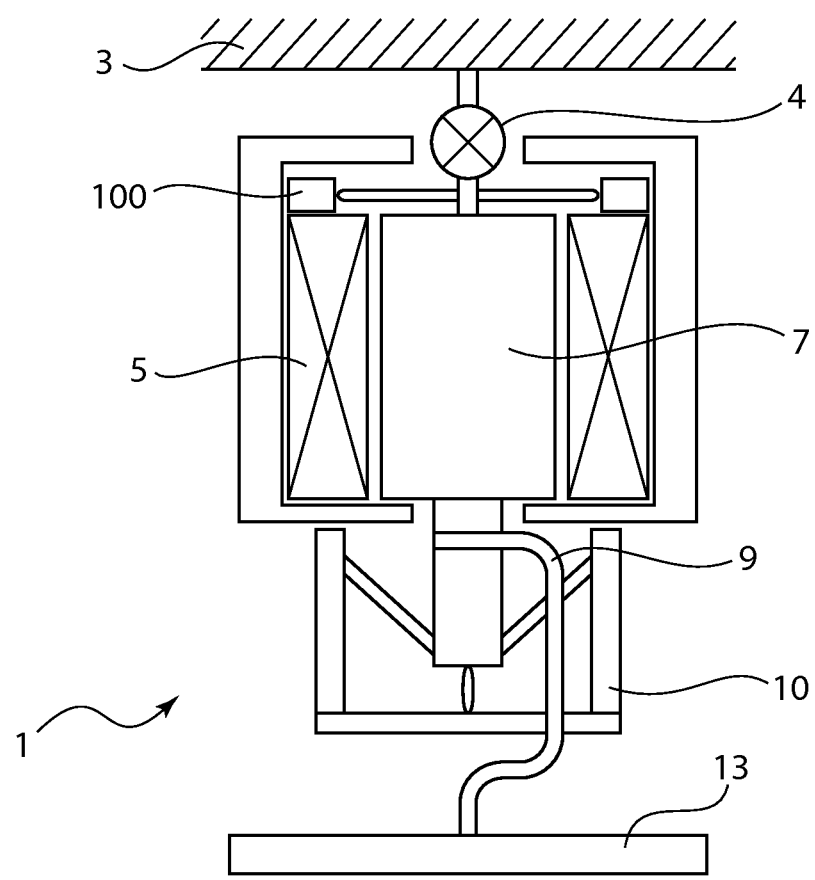
FIG. 1 is a schematic view illustrating the general environment of one use to which the embodiments of the device may be put.

FIG. 1 depicts the environment in which the apparatus disclosed herein may be used, namely, as part of an adiabatic refrigeration apparatus employed to cool a detector array to within a few degrees of absolute zero. A heat sink 3 (typically liquid helium) constitutes the high temperature side of the apparatus. It is connected via a heat switch 4 to a so-called "salt pill" 7, which undergoes adiabatic magnetic cooling in a manner known in the art. The salt pill 7 is contained within a magnet 5, and is connected at its opposite cold side to a detector array 13 via a thermal strap 9. On its cold side, the salt pill is axially constrained via a gimble suspension 13, and on its hot side (nearer the heat sink 3) via a lateral load suspension device 100, the details of which are set forth below. Although shown here as being used in conjunction with a single stage apparatus, multiple ADR stages may be employed, each having its own salt pill leading serially to a low temperature detector array. Moreover, the general arrangement of gimble suspension 13 and lateral load suspension device 100 can be inverted, so that the gimble suspension 13 is utilized at the end of the salt pill 7 nearer the heat sink 3 and the lateral load suspension device 100 is utilized at the other end of the salt pill 7.

Figure 2:
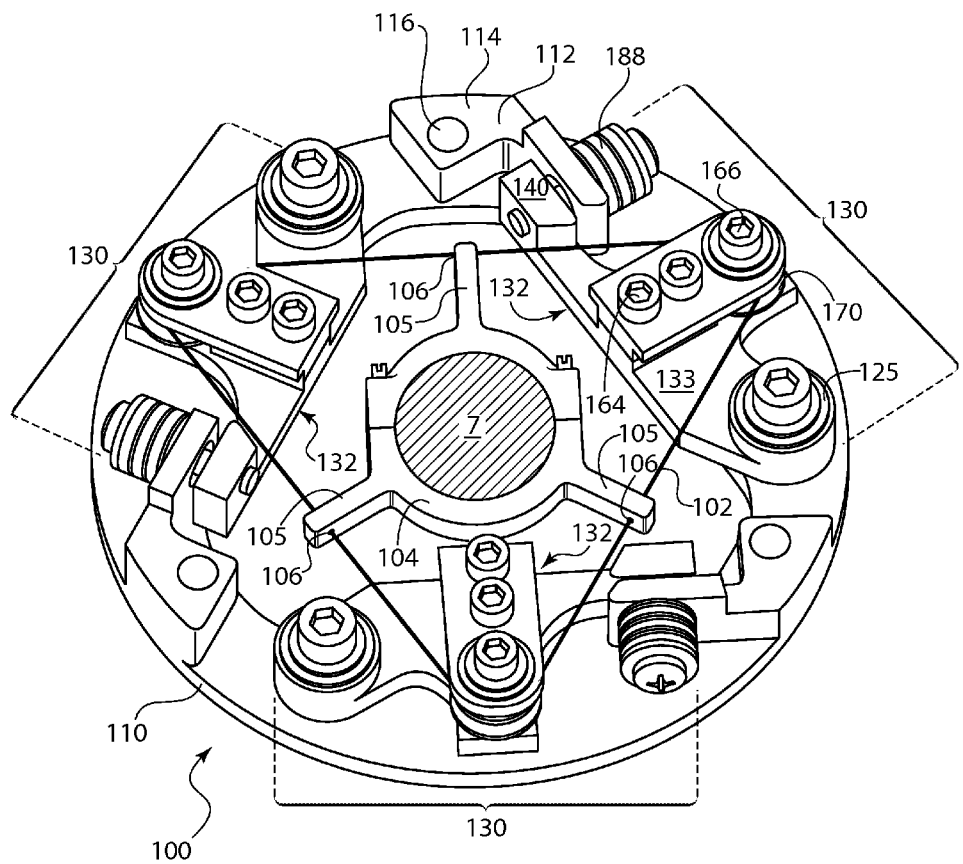
FIG. 2 is a top perspective view of a first embodiment of the device.
Figure 4:
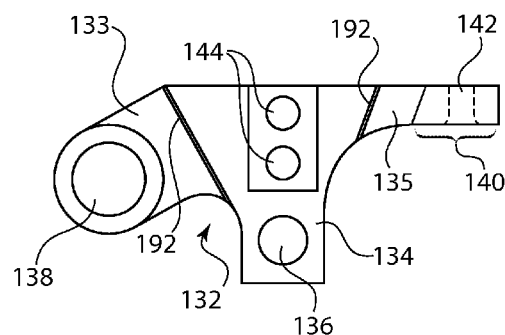
FIG. 4 is a top plan view of the tension arm used in the embodiment depicted in FIG. 2.
Figure 3:
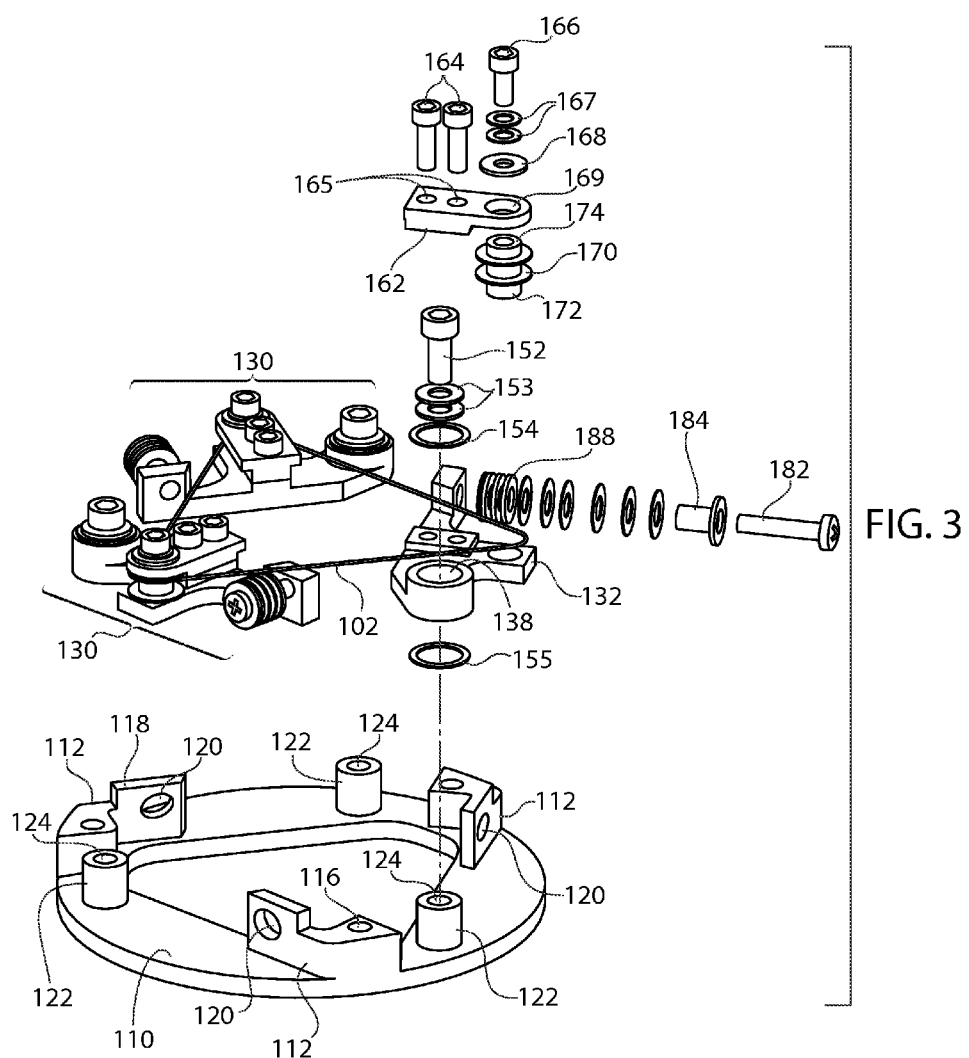
FIG. 3 is a partially exploded view of the embodiment in FIG. 2.

FIGS. 2-4 illustrate the features of one embodiment of the lateral load suspension device 100 that provides lateral stability against loading. It also provides thermal separation of the salt pill from the magnet and other elements of the ADR apparatus as shall now be more explicitly discussed with respect to FIGS. 2-4.

An outer ring support base 110 serves as a mount for three equally spaced apart and identical spring-loaded tension assemblies 130, which collectively entrain a band 102 that is made of a strong material having a low coefficient of thermal conductivity. It has been found that a band constructed of aramid fiber sold under the trademark Kevlar® has the suitable thermal and other mechanical properties for this purpose. Other fibers having similar properties of low heat conductivity and high strength may be used.

The ring support base 110 may be made of a metal such as aluminum, magnesium, or other metal or metal alloy (typically non-ferromagnetic). Where the apparatus is to be launched into space and weight is at a premium, then light weight metals and alloys are preferred.

The ring support base 110 has three identical angle support brackets 112 arrayed at equal intervals about its general periphery. As seen in FIGS. 2 and 3, these brackets 112 have a first portion 114 parallel to the face of the ring 110; a through-hole 116 to accommodate bolts or other hardware for attaching the device to magnets or other hardware within the ADR apparatus; and a vertically oriented bracket portion 118 which is provided with a through-hole 120. Adjacent but spaced apart from each of these brackets 112 is a cylindrical stem 122 which contains a tapped, threaded hole 124.

During cooling, the band 102 may become lax due to the behavior of the material as it cools to near absolute zero. Compensation for this laxity is provided by the three spring-loaded tension assemblies 130, which provide for a generally outwardly directed force that helps keep the band 102 taut. In the preferred embodiment, three tension assemblies are employed, as this provides the optimal degree of mechanical stability (three points suffice to determine a plane). However, in some settings it may be that more than three tension assemblies may be mechanically optimal.

Each tension assembly 130 is composed of a generally T-shaped tension arm 132 (see FIG. 4) having a left portion 133 having a through hole 138, a central stem 134 having a tapped hole 136 and a pair of tapped holes 144; and a right portion 135 that is further provided with a vertically extending portion 140 having a tapped hole 142. Hole 138 is sized so that it can contain stem 122, about which the tension arm 132 can pivot. The tension arm 132 is kept axially in place via threaded bolt 152 which screws into the tapped hole 124 in the stem 122, with washers 153 and 154 located above the tension arm 132, and washer 155 serving to space the tension arm 132 above the support base 110 (see FIG. 3). Thus constrained, the tension arm is free to rotate about the cylindrical stem 122 but not otherwise move axially. The tension arms are further provided with a pair of grooves 192 to accommodate the band 102 with a minimum of friction between the two.

Bracket 162 is attached to the tension arm 132 via threaded bolts 164, which pass through bracket through holes 165 to screw into the tapped holes 144 located in the central portion 134 of the tension arm 132. The bracket 162 also axially bounds a pulley 170 having a lower protruding portion 172 and an upper protruding portion 174. The upper protruding portion 174 fits into a through hole 169 in bracket 162, and the lower protruding portion 172 fits into the tapped hole 136 of the tension arm 132. Washers 167 and 168 are provided as shown in FIG. 3. The pulley is thus axially bound by the tension arm 132 and the bracket 162.

At the right portion 135 of tension arm 132, a Bellville washer spring assembly is provided. Threaded bolt 182 passes through a fitting 184 into tapped hole 142, and provides a stem onto which are placed the Bellville washers 188. Alternatively, other mechanical elements providing a compressive force, such as a compression spring, may be used in place of a Bellville washer. The result is that the spring, which can be adjusted by adding nestable Bellville washers to one another and/or by adjustments to the bolt 182, generates a compression force that directs the tension assembly 130 to pivot generally radially outwardly about the cylindrical stem 122, and thereby take up any slack that should develop in the band during cooling.

The salt pill 7 is held within a split ring salt pill collar 104 (FIG. 2) that terminates in three arms 105, each of which is provided with a through-hole 106 to accommodate the passage of the band 102.

When the suspension device is assembled, it is pretensioned as noted above to provide a level of spring force via the Bellville washer assembly sufficient to keep the band 102 taut during its subsequent cool-down and use within the ADR.

Figure 5:
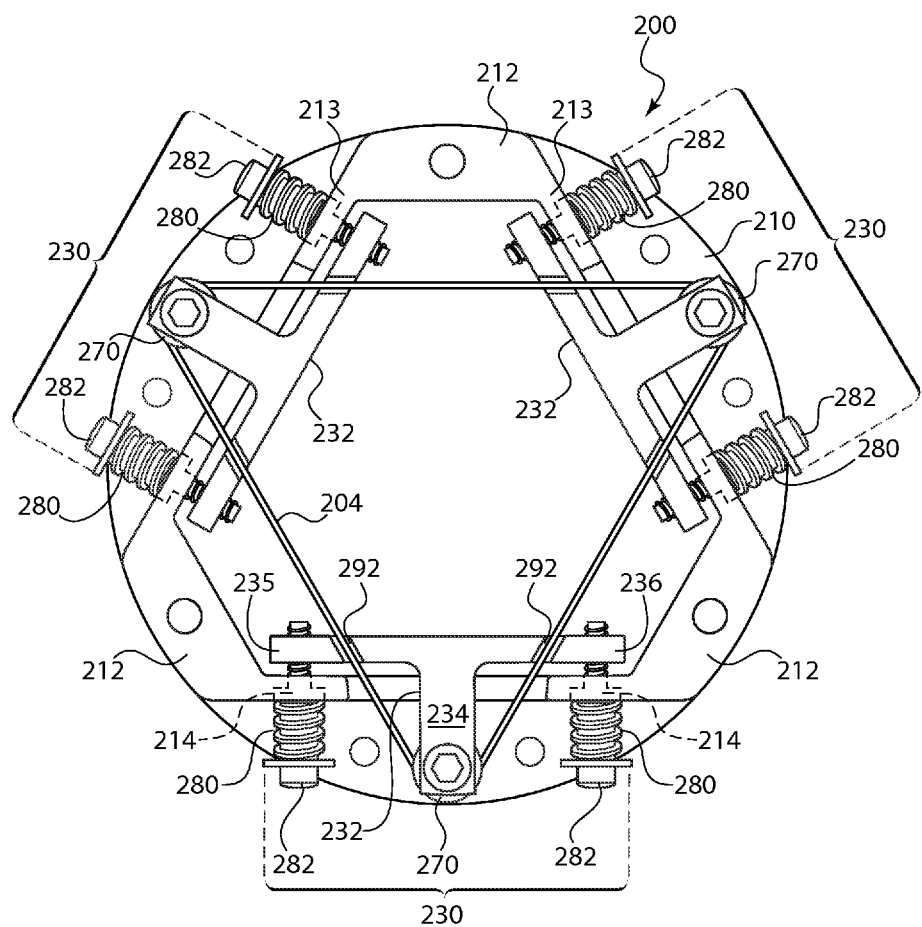
FIG. 5 is a top perspective view of a second embodiment.

FIG. 5 illustrates an embodiment of a lateral load suspension device 200 in which each tension assembly 230 has two compression springs 280.

The ring-shaped support base 210 is provided with three angle support brackets 212, each of which has two wing portions 213 that each have a tapped through hole 214 to receive a threaded bolt 282 that screws into a correspondingly tapped threaded hole in the left and right wing portions 235, 236 of a generally T-shaped tension arm 232, which also has a central stem 234. Held within a slot inside the central stern is a pulley 270. Both the left and right wing portions 235, 236 are further provided with grooves 292 to accommodate the band 204 so as to minimize friction therebetween.

A pair of compression springs is employed to urge the tension assembly 230 in a generally radially outwardly direction. For example, an assembly of compression spring 280, washer and threaded bolt 282 is provided at each side of tension arm 232 to bias the tension arm in a radially outward direction to remove any slack in the band 204. The level of bias can be adjusted by adjustments to the bolts 282 or to the stiffness of the springs employed.

A split ring salt pill collar similar to the one depicted in FIG. 2 (not shown in FIG. 5) provides for the connection of the salt pill to the band 102, which as in the previous embodiment is made of an aramid polymer.

Each embodiment provides a mechanically stable and thermally isolated mounting for a salt pill in a low temperature apparatus such as in an ADR and allows for the salt pill to be maintained in a correct position with respect to the ADR, even when the device is subjected to temperatures within a few degrees of absolute zero.

What is claimed is:

1. A suspension device for use with a refrigerator, comprising:
    a ring-shaped support base;
    at least three tension assemblies, each comprising pulleys and tensioning elements;
    further comprising a band of material that is entrained about the pulleys and held in a taut state by the tensioning elements;
    wherein each tension assembly is urged by its tensioning element in a generally radially outward direction with respect to the support base.

2. The suspension device of claim 1, wherein the band is made of a material having a low coefficient of thermal conductivity and high strength.

3. The suspension device of claim 1, wherein the band comprises an aramid fiber.

4. The suspension device of claim 1, wherein the tension assembly comprises:
    a tension arm having a central portion and side portions attached to the central portion;
    a pivot point about which the tension arm may pivot with respect to the base via one of its side portions;
    and wherein the tensioning element provides a compressive force to the other of the side portions of the tension arm.

5. The suspension device of claim 4, wherein the tensioning element comprises a Belleville washer.

6. The suspension device of claim 1, each tension assembly comprising a tension arm having side portions that are each connected via a tensioning element to a bracket attached to the support base and wherein said tensioning elements urge the tension arm in a generally radially outward direction.

7. The suspension device of claim 1, wherein the tension assemblies comprise grooves to accommodate a band.

8. The suspension device of claim 1, further comprising a centrally disposed collar, said collar having three arms, each of which arms having a hole through which the band can pass.

9. The suspension device of claim 8, wherein the collar is a split ring.

10. The suspension device of claim 1, comprising a salt pill and a centrally disposed collar for laterally securing the salt pill, wherein the collar is attached to the band.

11. The suspension device of claim 1, wherein the number of tension assemblies is three.

12. The suspension device of claim 1, wherein the ring is made of magnesium.

13. The suspension device of claim 1, wherein the ring is made of non-ferromagnetic material.

14. The suspension device of claim 1, wherein the device comprises a salt pill and a collar linking the salt pill to the band, and secures the salt pill against lateral movement.

15. The suspension device of claim 14, wherein the suspension device is mechanically stable even when cooled to within one degree of absolute zero.

16. The suspension device of claim 6, wherein the tensioning elements are springs.

17. An apparatus for signal detection comprising:
- an adiabatic demagnetization refrigerator, including a quantity of salt that is contained within a salt housing having first and second ends, the first end being a high temperature side and the second end being a low temperature side;
- a laterally constraining suspension connecting the high temperature side of the housing to the refrigerator to stabilize that side of the salt housing against lateral movements of the salt housing with respect to the refrigerator;
- a gimbal suspension securing the low temperature side of the salt housing against axial movement; and
- a detector in thermal communication with the low temperature side of the salt housing.

18. The apparatus of claim 17, wherein the laterally constraining suspension comprises:
- a ring-shaped base;
- a band;
- a plurality of tensionable elements that fix the band of material tautly in place; and
- a collar that connects the salt housing to the band.

* * * * *